United States Patent

Rittenhouse

[15] 3,705,263

[45] Dec. 5, 1972

[54] SCAN CONVERTER MULTIPLEXING SYSTEM

[72] Inventor: Larry E. Rittenhouse, Carmel, N.Y.

[73] Assignee: International Business Machines Corporation, Armonk, N.Y.

[22] Filed: June 30, 1971

[21] Appl. No.: 158,487

[52] U.S. Cl. ..............178/6.8, 178/69.5 TV, 315/12, 340/324 A

[51] Int. Cl. ..............................................H04n 5/02

[58] Field of Search .........178/6.8, DIG. 22, DIG. 23, 178/69.5 TV; 315/11, 12; 340/324 A

[56] References Cited

UNITED STATES PATENTS

| | | | |
|---|---|---|---|
| 3,180,931 | 4/1965 | Morchand | 178/6.8 |
| 3,179,745 | 4/1965 | Stone, Jr. | 178/6.8 |

*Primary Examiner*—Robert L. Griffin
*Assistant Examiner*—Richard K. Eckert, Jr.
*Attorney*—Isidore Match et al.

[57] ABSTRACT

In the disclosed system, the storage screen of a scan converter or a recording storage tube is divided into a plurality of image areas such as four quadrants, for example. In each of these quadrants, there are written on the screen respective different images which are destined for four terminals. The storage screen is then read by having the reading beam therein sweep the total width of the storage screen in a raster scan. A spatial multiplexing arrangement is provided to transmit to each of the terminals the respective images to be received thereby. In this system, therefore, there is enabled the efficient use of a recording storage tube since its employment can be shared by a plurality of terminals. In an embodiment of the invention, the sync signals for the reading beam in the recording storage tube and those for the terminals can be so arranged whereby two raster lines are provided for each terminal for one raster line in the recording storage tube. Where a non-interlaced scan is employed in the terminals, then two fields are utilized per frame. However, where an interlaced scan is provided in the terminals, then four fields are utilized per frame.

6 Claims, 20 Drawing Figures

INVENTOR
LARRY E. RITTENHOUSE
BY Isidore Match
ATTORNEY

SCAN CONVERTER MULTIPLEXING SYSTEM

BACKGROUND OF THE INVENTION

This invention relates to scan conversion systems. More particularly, it relates to a novel multiplexing system which enables great improvement in the efficient employment of scan converters or recording storage tubes.

Recording storage tubes are well known. Their function is to convert graphic or video images from one format to another. A conventional use for these devices is the conversion of television video from one raster format to a different format. Generally, recording storage tubes comprise a recording storage tube having a storage screen upon which an image is written in one format and, concurrently or subsequently, the image on the storage screen is read out in another format.

The typical situation where a recording storage tube can be advantageously employed is as a translation device or interface between a computer and a relatively inexpensive raster-scanned terminal display device. In this connection, it is to be realized that images are most easily generated and manipulated by a computer when they are defined by the vector end point notation as is employed in vector plotting display devices. Correspondingly, images are most economically displayed at a terminal which is a raster-scanned display device such as a television monitor.

In the operation of a recording storage tube, a vector image is written on the storage screen of the converter in response to the operation of a computer and the stored image on the converter's storage screen is read therefrom in a raster format for a display device, the image being repetitively read from the storage screen and transmitted to the display device.

Although known scan converters are effective for their purpose, heretofore, the salient disadvantage presented in their use has been their high cost.

Accordingly, it is an important object of this invention for providing a system which enables improved efficiency and economy in the use of recording storage tubes.

It is another object to provide a multiplexing system for use in conjunction with the recording storage tube which enables the sharing of the storage tube with a plurality of video terminals.

SUMMARY OF THE INVENTION

In accordance with the invention, there is provided a system for effecting the sharing of a recording storage tube means among a plurality of raster scan terminals. In this system, the recording storage tube means includes a raster scannable storage screen, electron beam means for writing video information on said storage screen and electron beam means for reading the written video information from said storage means. Each of the terminals includes electron beam scanning means. The system comprises means adapted to be connected to the recording storage tube means for providing a plurality of video images to be written on the plurality of discrete image areas on the storage screen. This means can suitably be a computer controlled display system wherein the recording storage tube is utilized instead of the conventional cathode ray tube. The operation of the computer determines the writing of the plurality of images on the different areas of the storage screen of the recording storage tube. Means are provided for generating a first signal which is a composite of horizontal and vertical sync signals for the recording storage tube reading electron beam means. Means are also included for generating a second signal in synchronism with the first signal, the second signal being a composite of horizontal and vertical sync signals for the terminals. There are included means for applying the first signal to the recording storage tube to cause the video images on the storage screen to be read therefrom. Means are provided for generating the aforementioned plurality of gates in synchronism with the first and second signals, each of the gates being associated with a discrete one of the terminals. There are also included the aforesaid plurality of sync and video mixers, each of the sync and video mixers being associated with a particular one of the terminals. Means are provided for applying to each of the sync and video mixers the video images read from the storage screen, the second signal and the one of the gates associated in common with a particular image area, sync and video mixer and terminal. There are also provided means for applying the outputs of each of the sync and video mixers to the terminals respectfully associated therewith whereby the video images written on the image areas of the storage screen are respectively provided to each of the terminals.

The foregoing and other objects, features and advantages of the invention will be apparent from the following more particular description of the preferred embodiments of the invention, as illustrated in the accompanying drawings.

DESCRIPTION OF A PREFERRED EMBODIMENT

Figure 1:
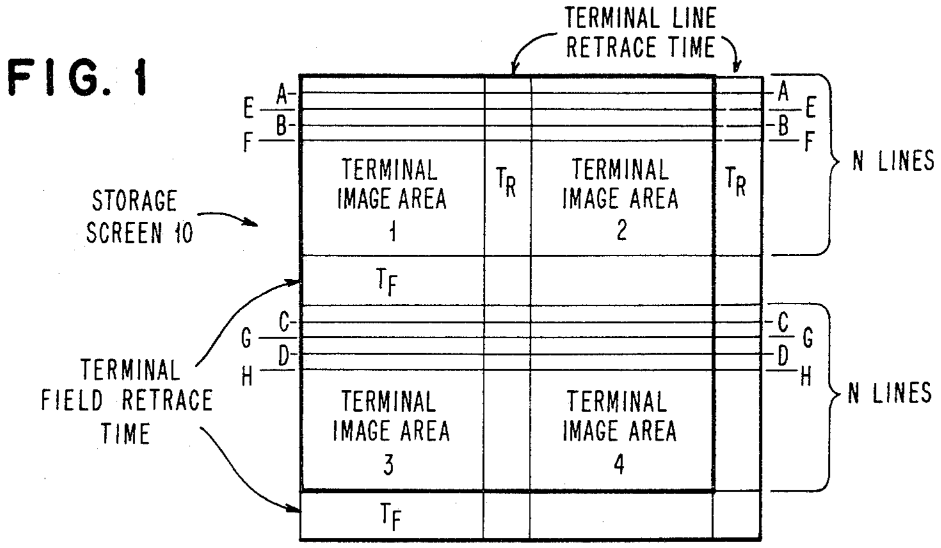
FIG. 1 is a depiction of the storage screen of a recording storage tube having a plurality of terminal image areas (four in this example) according to the invention.

Reference is made to FIG. 1 wherein there is shown a storage screen 10 of a recording storage tube, the tube being of a type wherein images can be written on and read from its storage screen. In accordance with the invention, and for convenience of explanation, the screen has been divided into four quadrants, i.e., terminal image areas 1, 2, 3 and 4. On each of these image areas, a discrete image is written, the images in the respective areas being destined for terminals of the raster scan type. For convenience of description, only lines A–H are shown written on the screen of the storage tube although in actual practice, the screen is of course filled with raster lines. There are shown four image areas but is is to be realized that within the limits of practicality, there may be used as many areas as is desired.

Figure 2:
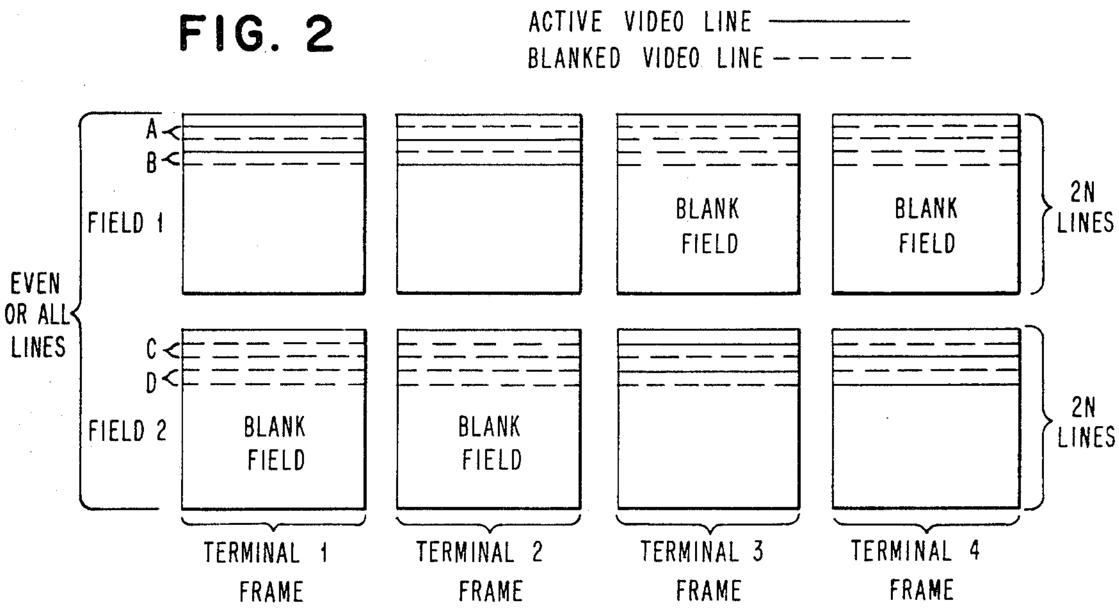
FIG. 2 is a depiction of the screens of a plurality of terminals (four terminals in this example) receiving respective video image information from the storage screen, there being employed two fields per frame.

The operation of the invention is now explained in conjunction with FIG. 2 wherein the assumption is made that terminal image areas 1 and 2 merely contain lines A and B and terminal image areas 3 and 4 only contain lines C and D. In this situation as the read beam sweeps line A on the storage tube, the left portion of line A up to the width $T_R$ appears on the screen of terminal 1 and is blanked out on the screens of terminals 2, 3 and 4. Now, when the portion of line A to the right of the width $T_R$ is scanned, it appears on terminal 2 and is blanked out on the screens of terminals 1, 3 and 4. Similarly, with the scanning of line B on the converter storage screen, the left portion appears as to the third line on the screen of terminal 1 and is blanked out on the screens of terminals 2, 3 and 4 and then the right portion of line B appears as the fourth line on the screen of terminal 2 and is blanked out on the screens of terminals 1, 3 and 4. The width $T_R$ provides the line retrace time of the terminal scanning beam.

Now, when the read beam of the storage tube scans line C and D, the left portions of lines C and D appear as the first and third lines on the screen of terminal 3 and the right portions of line C and D appear as the second and fourth lines on the screen of terminal 4. During the scanning of lines C and D, all of the four lines are blanked out on the screens of terminals 1 and 2.

It is seen in FIG. 2 that the scanning of lines A and B takes place in field 1 and the scanning of lines C and D takes place in field 2. The width $T_F$ provides the terminal field retrace time.

Since each line on the storage screen of the scan converter results in two lines on the screens of the terminals whether blanked or unblanked and if the number of lines on the storage screen scanning terminal image areas 1 and 2, and 3 and 4 respectively, are taken to be equal to N, then there results 2N lines on the screen of each terminal. Each frame consists of two fields. An active video field alternating with a blank field. The active video field has active video lines alternating with blank lines.

It is well known that, to avoid flicker in the terminal image, it is required that an active video field be displayed on each terminal at not less than 30 fields per second Thus, if active video field rate is provided at each terminal (using the example of four terminals) or 30 fields per second, then the terminal raster field rate is 120 fields per second. To affect such number of fields, the storage screen in the scan converter tube is read at a frame rate of 30 frames per second.

Figure 3:
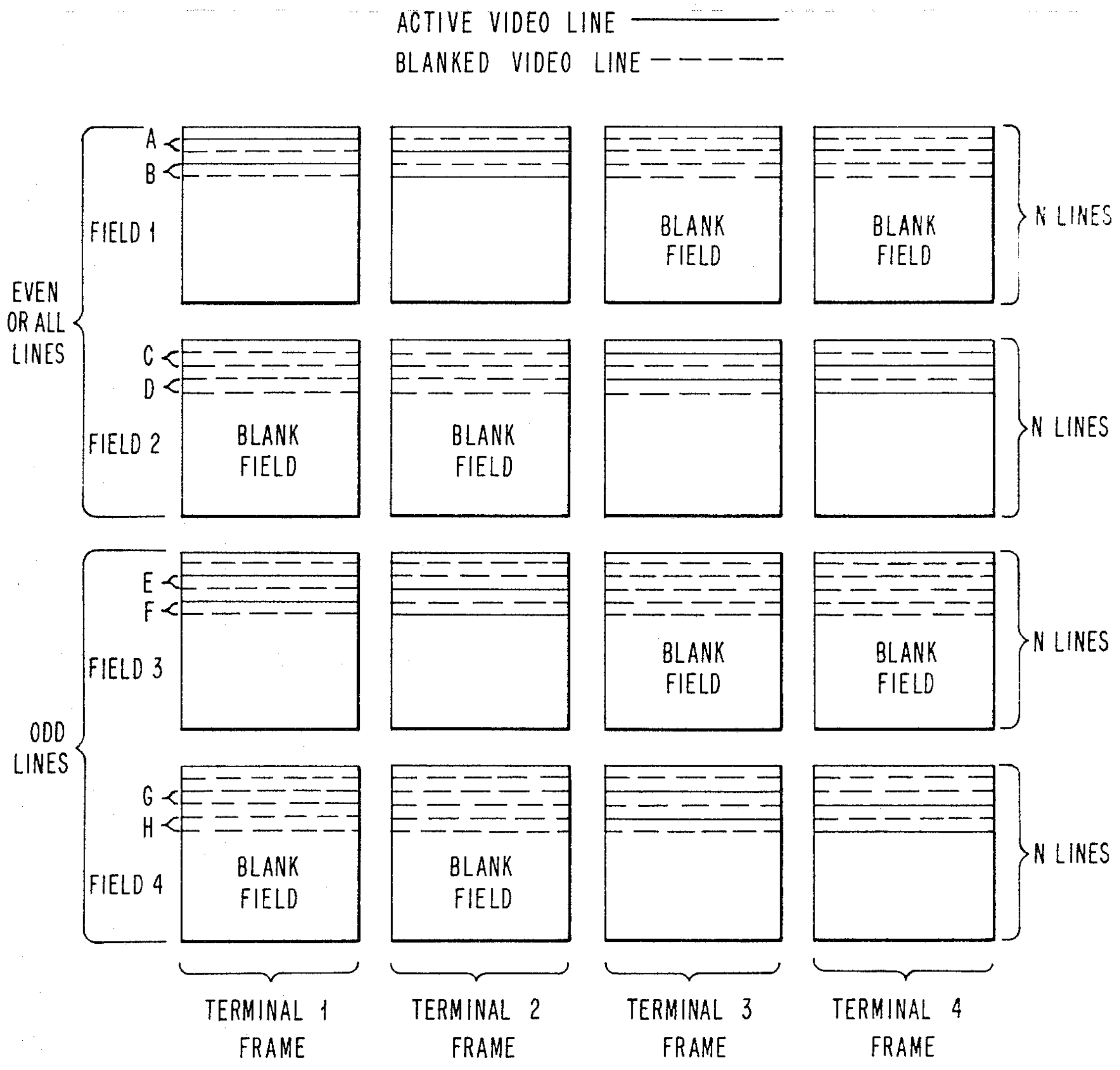
FIG. 3 is a depiction similar to FIG. 2 but wherein four fields are employed per frame.

Reference is now made to FIG. 3 wherein there is shown a two-to-one interlaced frame type of operation. In this operation, it is assumed, that terminal image areas 1 and 2 comprise N lines. For example, these lines are shown to be A, E, B, and F in this order. Correspondingly, terminal image areas 3 and 4 comprise N lines. These lines are C, G, D and H in that order. In the interlaced frame operation, lines A and B are scanned consecutively, i.e., as alternately occurring lines in terminal image areas 1 and 2 beginning with the first line and then the alternately occurring lines C and D are scanned beginning with the first line C in terminal image areas 3 and 4. There thus results field 1 and field 2 for each of the terminal screens as shown in the two upper rows of FIG. 3. After lines A, B, C and D have been scanned, the interlaced scanning commences with each alternately occurring line beginning with lines E and F in terminal image areas 1 and 2. Beginning with the second line therein, viz., line E, in field 3 for the terminal screens. Thereafter, alternately occurring lines in terminal image areas 3 and 4 are scanned beginning with the second line in field 4 for each of the terminals. This arrangement results with N lines in each field since only half of the lines are scanned in a single raster scan of the screen of the storage tube. However, a two-to-one interlaced mode of operation as shown in FIG. 3 provides increased video resolution since all terminal raster lines contain active video during each terminal frame. The terminal frame contains four fields, one field containing active video on the even raster lines, one field containing active video on the odd raster lines, and two blank fields, active fields being alternated with the blank fields.

Accordingly, with the inventive concept as described above, there is enabled an efficient employment of the expensive recording storage tube by spatially multiplexing its use, i.e., by dividing its storage screen into a given plurality of image areas, assigning each of these areas to a terminal and then spatially multiplexing the image on the storage screen of the recording storage tube whereby each of the terminals receives an image destined therefor.

There follows hereinbelow a description of a preferred embodiment of a system for carrying out the inventive concept as disclosed and explained hereinabove in connection with FIGS. 1, 2 and 3. In this embodiment, there may be utilized a recording storage tube as described in the publication "Technical Information CK1383," Raytheon Company, 55 Chapel Street, Newton 58, Mass. dated Feb. 15, 1963.

The storage screen of the recording storage tube is divided into image areas, four for example. One frame of each image to be displayed on a raster scanned terminal display device is recorded on its image area employing any of the conventional techniques for creating images on cathode ray tube displays. Such techniques may be, for example, intensity modulated raster, direct beam deflection, etc. Relative to direct beam deflection, a typical example of a device utilizing such operation is the IBM 2250 display unit which is under computer control, a typical computer which may be employed in this connection being the IBM 1130 computer. The structure and operation of the IBM 1130 general purpose computer and the IBM 2250 display unit are described in the IBM Systems Reference Library Publications entitled "IBM 1130 Computing System Component Description" and "IBM 2250 Display Unit Model 4" Form No. 1130–03 A27–2723–1. To effect the recording of the respective images on the screen of the recording storage tube, it is merely necessary for the storage tube to replace the cathode ray tube in the aforementioned IBM 2250 display unit, there only being required in this replacement the applying of the proper voltages to the various electrodes of the recording storage tube. The computer which controls the IBM 2250 Display Unit provides the information thereto for producing the various images on the respective image areas of the storage screen of the recording storage tube.

Figure 4:
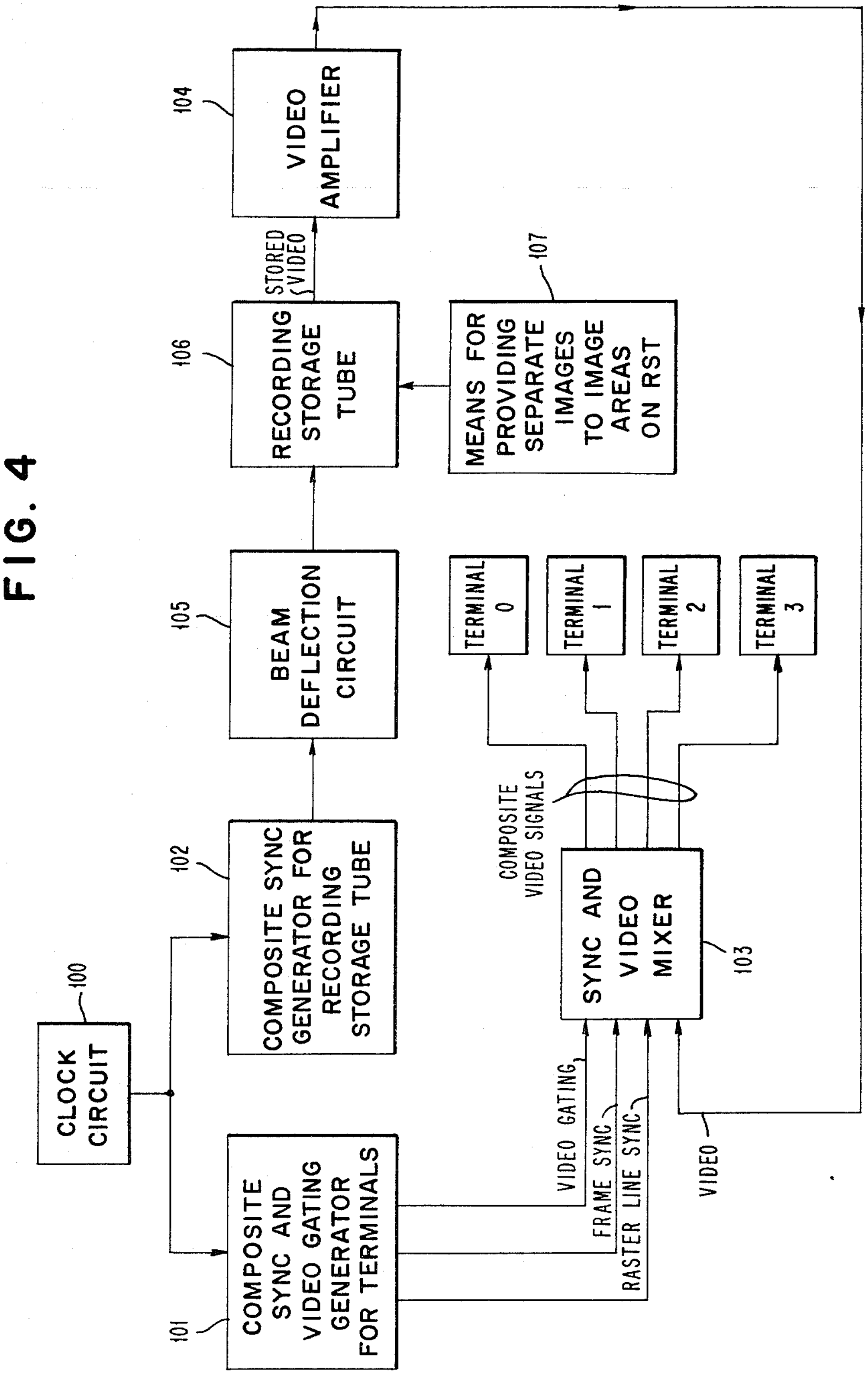
FIG. 4 is a block diagram of an arrangement to broadly implement the inventive concept.

Reference is now made to FIG. 4 wherein there is shown an embodiment for carrying out the inventive concept. In this embodiment, there is provided a clock circuit stage 100. Stage 100 is suitably a crystal controlled pulse generator whose pulse train output controls the timing for the total system. The output of clock circuit stage 100 is applied to a stage 101 legended composite sync and video dating generator for terminals and the stage 102 legended composite sync generator for recording storage tube. Stage 101 suitably comprises circuits for generating synchronization pulses for the raster lines of the terminals, a circuit for generating synchronization signals for the frames of the terminals and the video gating signals. The signals produced from stage 101 and supplied to a stage 103 legended sync & video mixer. In stage 103, there are combined the three sync signals from stage 101 and the output of the video amplifier which amplifies the video signals read from the storage screen in the recording storage tube as is further explained.

The video gating signals produced in stage 101 provide for gating to the proper terminal the serial video signal read from the recording storage tube which is amplified by the video amplifier 104. The outputs from stage 103 are respectively composite video signals for each of terminals 0, 1, 2 and 3. These composite video signals contain identical horizontal and vertical synchronization pulses, the only difference between the several composite signals being the video portion of the signal which is added to the synchronization signals at the proper time to generate the proper display intended for each terminal.

The terminals 0, 1, 2 and 3 may suitably be of a TV type raster scan display type terminal.

In stage 102, responsive to the clock pulse output from stage 100, there are generated the horizontal or line and vertical or frame synchronization signals and the combining thereof, the output of stage 102 being applied to the beam deflection circuit 105 for the recording tube 106, beam deflection circuit 105 controlling the reading raster on the storage screen in the recording storage tube 106. The video signal which is read from the storage screen in the recording storage tube 106 is amplified by amplifier 104 to produce the video signal which is applied to the sync and video mixer stage 103.

The circuits depicted in block form in FIG. 4 are well known in the art and no further description thereof is deemed necessary. Thus, for example, the composite and video gating generator for the terminals, i.e., stage 101 and the sync and video mixer stage 103 are similar to those found in conventional television apparatus. Stage 102, the composite sync generator for the recording storage tube 106, its beam deflection circuit 105 and the video amplifier 104 are also well known and are illustrated in the above-referred to Raytheon Company publication. The terminals 0, 1, 2 and 3 are of the well-known raster scanned cathode ray tube type which are used as I/O devices in computer systems and as TV monitors and receivers.

Figures 5, 5A:
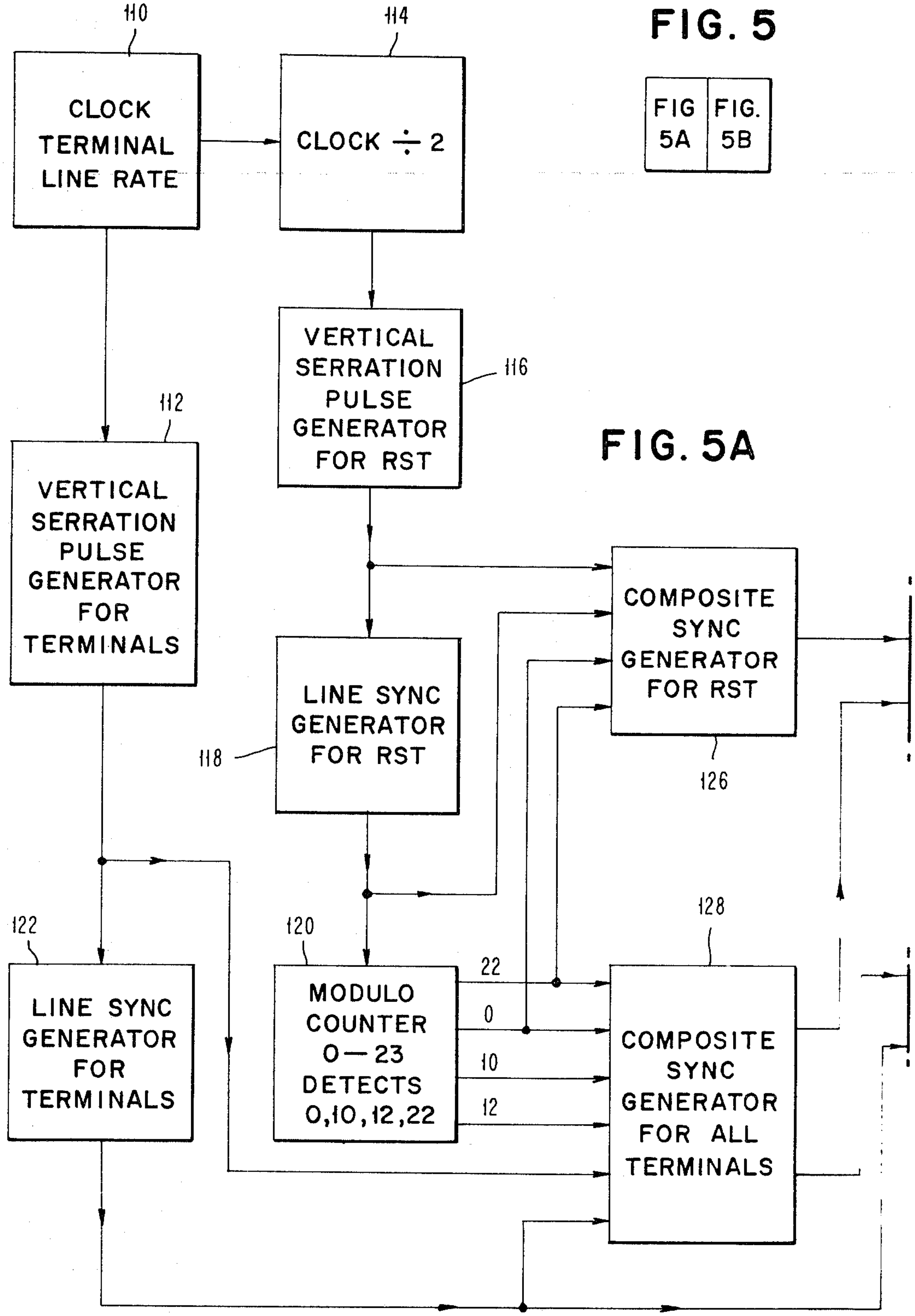
FIGS. 5A and 5B, taken together as in FIG. 5, form a block diagram of an embodiment constructed according to the invention.
Figure 5B:
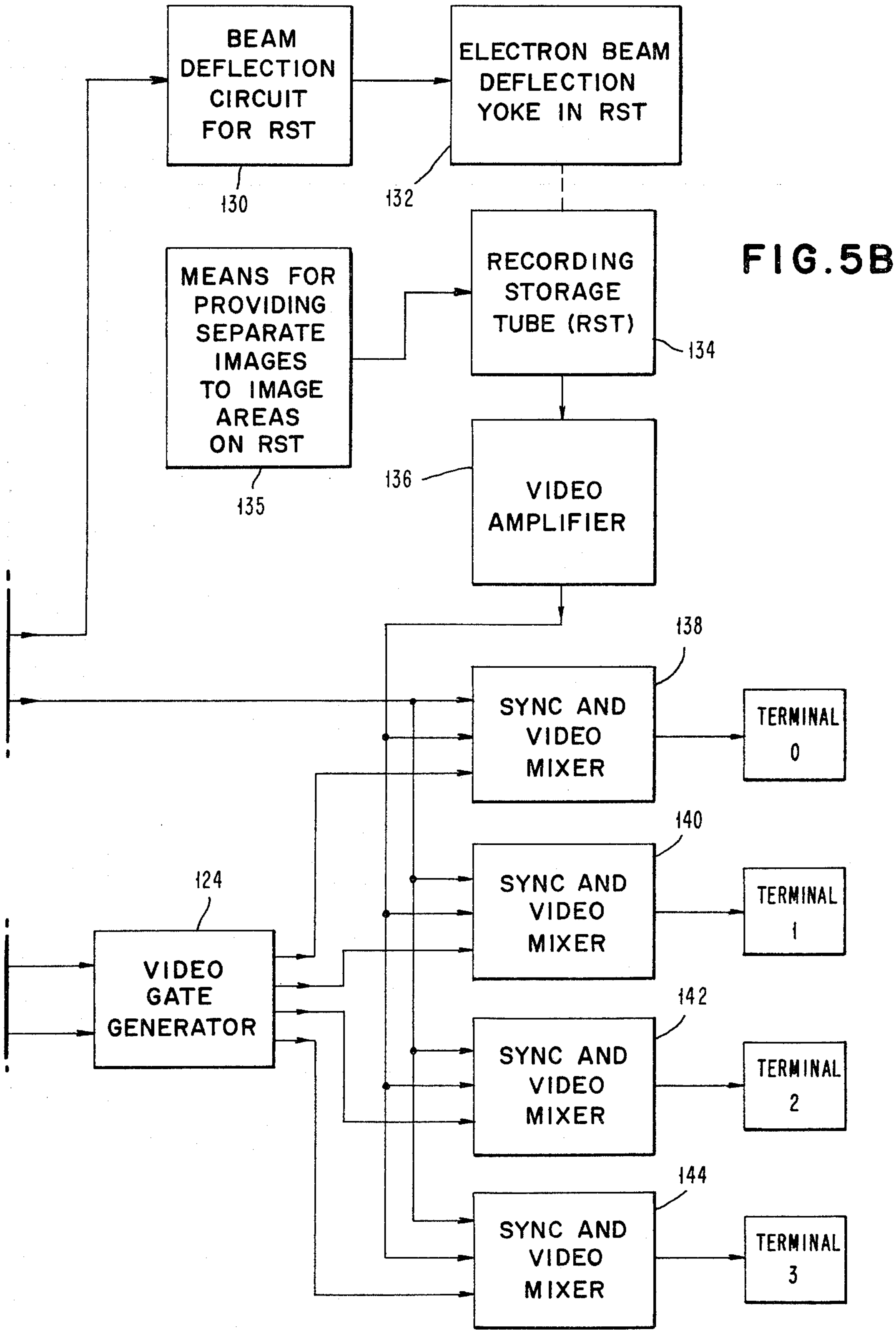
Figure 6:
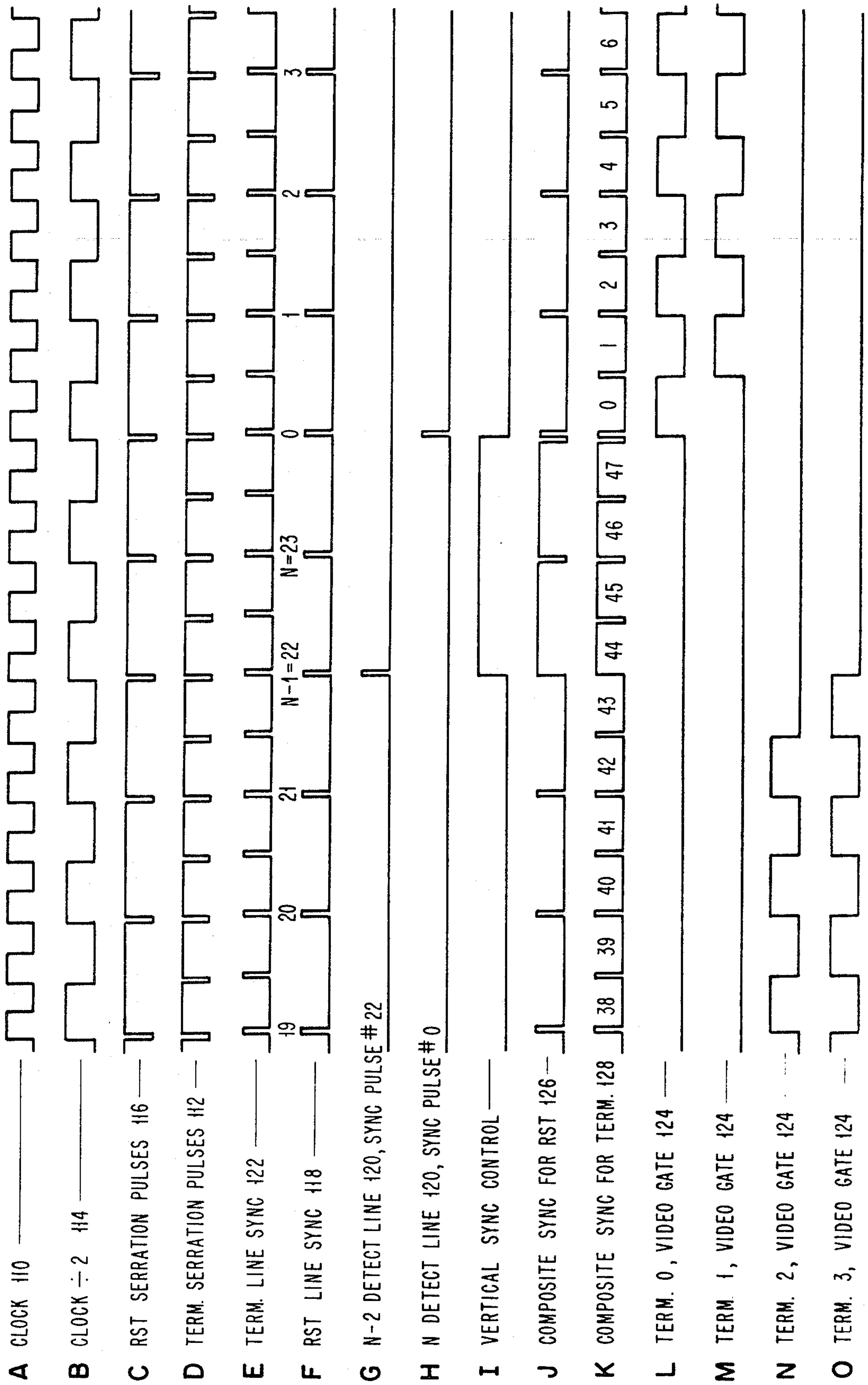
FIG. 6 is a timing diagram of some of the waveforms occurring at different points in the embodiment shown in FIG. 5.
Figure 7:
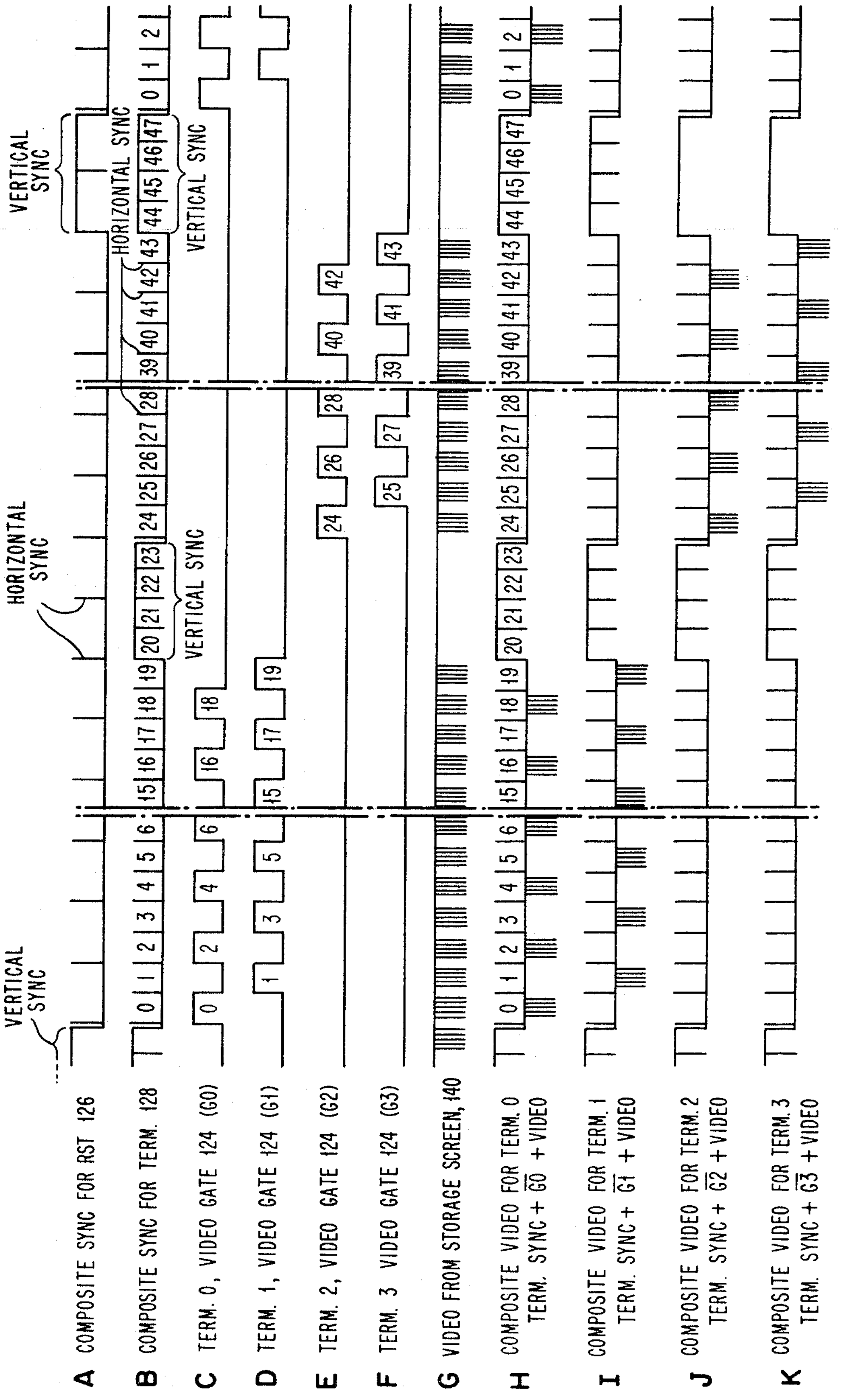
FIG. 7 is a timing diagram similar to that of FIG. 6 and shows some of the other waveforms occurring at different points in the embodiment shown in FIG. 5.

Reference is now made to FIGS. 5A and 5B taken together as FIG. 5 wherein there is shown an illustrative embodiment constructed according to the principles of the invention. In FIGS. 6 and 7, there are shown waveforms which occur in the operation of the embodiment in FIG. 5 and FIGS. 8A, 8B, 8C, 8D and 8E taken together as FIG. 8 illustrates the events occurring on the storage screen in the recording storage tube and on the CRT display screens in the terminals.

In FIG. 5, the clock stage 110 legended clock terminal line rate corresponds to the clock shown in FIG. 4 and is suitably a pulse generator for generating a square wave having a frequency which is equal to the desired line repetition rate of the terminals. The square-wave generated by stage 110 also is the synchronizing signal for determining the timing throughout the system. This square wave is shown in line A of the timing diagram of the waveforms depicted in FIG. 6. The output of clock 110 is applied to a stage 112 legended vertical serration pulse generator for terminals. This generator is suitably a monostable multivibrator and provides an output waveform such as shown in line D of FIG. 6. The function of serration pulses is discussed in the text entitled "Elements of Television Systems" by George E. Anner, published by Prentice-Hall, Inc., Englewood Cliffs, N.J., dated 1951. This discussion is on page 405 of this text.

The output of stage 112 is applied both to a stage 122 legended line sync generator for terminals and to a stage 128 legended composite sync generator for all terminals. The waveform of the output of stage 122 is shown on line E of FIG. 6 and may also suitably be produced by a monostable multivibrator. It is to be noted that the leading edges of the pulse train of line E, i.e., the output of stage 122, occur simultaneously in time with the trailing edges of the pulses in the waveform of line D. Such displacement in time is provided between the pulses of these two trains, respectively, since it is the positive shift of these synchronization signals that triggers the line retrace mechanism in the terminals. The pulses in the waveform of line E are the horizontal line sync pulses which are used by the composite sync generator for all terminals 128 and by the video gate generator 124 to generate the video gating signals for the terminals. The waveform outputs of video gate generator 124 are shown on lines L, M, N and O of FIG. 6. Video gate generator 124 can suitably be waveforms as shown in lines L, M, N and O, the significance of these waveforms being further explained hereinbelow.

The signals from video gate generator 124 are applied to sync and video mixers 138, 140, 142 and 144, their function being to gate the video information received from the video amplifier 136, i.e., to gate the video information read from the respective image areas on the storage screen of the recording storage tube to the proper terminal as it is read.

To generate the composite sync signals for the terminals and for the recording storage tube, the clock signal output, stage 110, is applied to a stage 114 legended clock 2, stage 114 suitably comprising a flip-flop, the output of stage 114 being shown on line B of FIG. 6; the waveform shown in line B having half the frequency of that shown in line A, i.e., the output of clock circuit 110. This output drives a stage 116 legended vertical serration pulse generator for RST, the latter generator suitably being a monostable multivibrator whose output is the waveform shown in line C of FIG. 6. The output of stage 116 drives a stage 118 legended line sync generator for RST, this generator also suitably being a monostable multivibrator having a waveform output such as shown in line F.

Figure 8E:
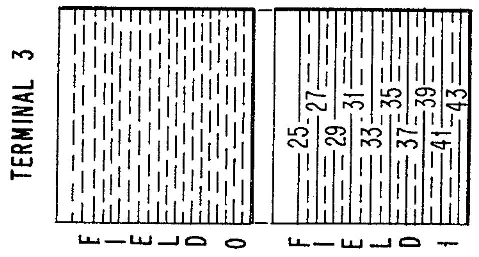
FIGS. 8B–8E show the numbered raster lines corresponding to those shown in FIG. 8A on the screens of the terminals receiving video image information from the storage screen.
Figure 8D:
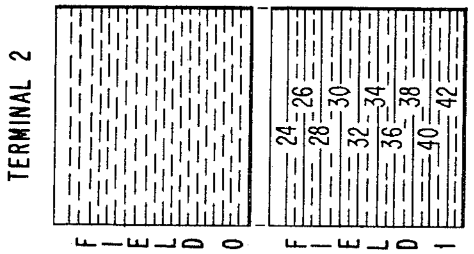
Figure 8C:
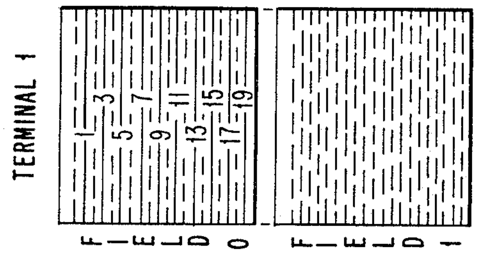
Figure 8B:
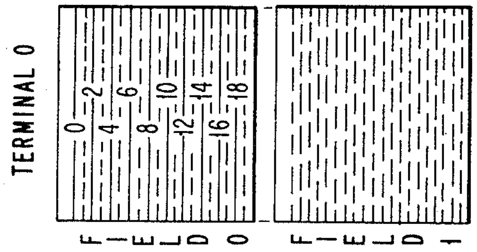
Figure 8A:
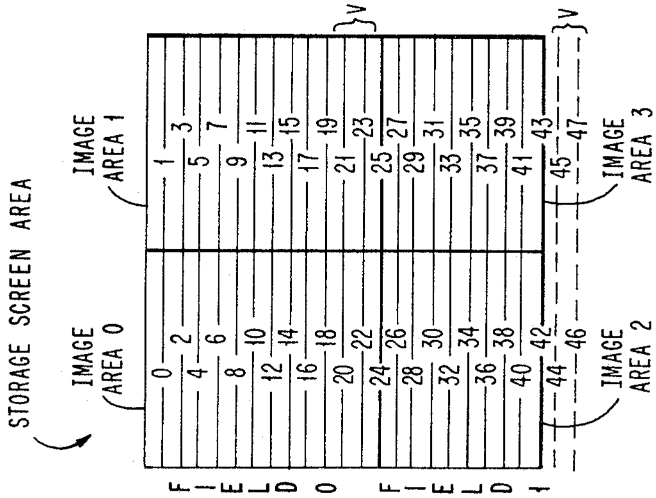
FIG. 8A is a depiction similar to FIG. 1 and shows numbered raster lines on the screen of the recording storage tube.

Reference is made at this point to FIG. 8A, 8B, 8C, 8D, and 8E. These FIGS. are essentially similar to FIGS. 1 and 2. Thus, FIG. 8A shows the screen of the recording storage tube divided into four image areas; FIG. 8B shows the two fields for terminal 0, FIG. 8C shows the two fields for terminal 1, FIG. 8D shows the two fields for terminal 2 and FIG. 8E shows the two fields for terminal 3. In addition, these FIGS. also show the numbers of the active raster lines on the particular screens during the two fields.

It is to be noted that, on line F or FIG. 6, the pulses occurring in the output of the line sync generator for the RST 118 are numbered from 0 to 23. These synchronization pulses correspond to the raster lines on the storage screen of the recording storage tube shown on FIG. 8A. Each half line or terminal line shown in FIG. 8B, 8C, 8D, and 8E have been given designating numberals. Consequently, the range of numbers shown in FIG. 8A–8E run from 0–47.

In this connection, line sync generator pulses for the recording storage tube are applied to a stage 120 legended modulo counter 0–23, detects 0, 10, 12, 22. State 120 suitably comprises a modulo counter which cycles at every 24 counts and known detector circuits for detecting the counts 0, 10, 12 and 22 in the cycling of the counter. The signals produced from the count detectors of stage 120 are employed to generate the vertical synchronization pulses for both the composite sync signal for the recording storage tube, and the composite sync signals for the terminals. As seen in FIG. 5A, there are four outputs from stage 120, i.e., the signals resulting from the detection of counts 22, 0, 10, and 12. Line G in FIG. 6 shows the waveform on the 22 detect output line of stage 120, line H shows the output on the 0 detect line of stage 120. It is noted that line G is designated as N–2 which corresponds to line 22 on the storage screen raster and that line H is designated N which corresponds to line 24 on the storage screen raster N being the number of raster lines on the storage screen raster. Since there are two lines on the display raster on each display terminal screen for each raster line on the recording storage tube, two vertical sync pulses are required for the terminals for each vertical sync pulse for the recording storage tube.

The stage 126 legended composite sync generator for RST receives the output of stage 116, the recording storage tube serration pulses, the output of stage 118, i.e., the recording storage tube line sync pulses, and the detect outputs designated 22 and 0 from the modulo counter 120. The composite sync generator stage may include a flip-flop which is switched to its set state by the pulse on line G, i.e., the detect 22 pulse output of modulo counter 120 and is reset by the detect 0 pulse output of modulo counter 120 to produce the waveform on line I, FIG. 6, the latter waveform being the vertical sync pulse for the recording storage tube. To produce the output waveform on line J of FIG. 6, there is utilized an arrangement such as shown in FIG. 9.

Figure 9:
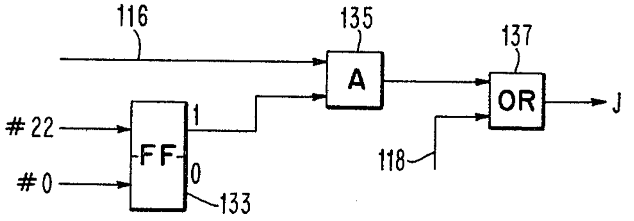
FIG. 9 is a block diagram of a suitable circuit for producing the composite sync signal for the recording storage tube.

In FIG. 9, it is seen that the 22 pulse detect and the 0 pulse detect lines are applied to the respective set and reset inputs of a flip-flop 133. The set output of flip-flop 133 being applied to an AND circuit 135, the other input to AND circuit 135 is the output of stage 116. The output of AND circuit 135 is applied to an OR circuit 137, the other input to OR circuit 137 being the output of stage 118. The output of OR circuit 137 results in the waveform shown on line J in FIG. 6.

Figure 10:
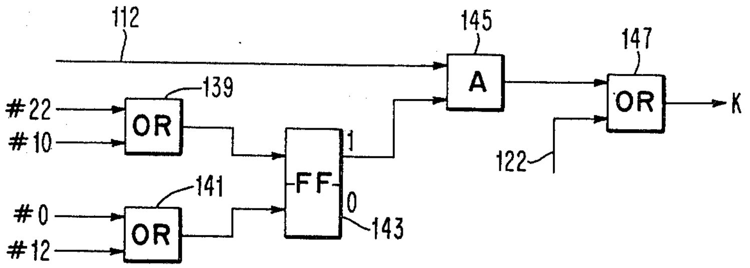
FIG. 10 is a block diagram of a suitable circuit for producing the composite sync signal for the terminals.

Stage 128 legended composite sync generator for all terminals receives the 22, 0, 10 and 12 detect line outputs from modulo counter 120, the output of the vertical serration pulse generator 112 and the output of line sync generator 122. These outputs are combined to produce the waveform on line K of FIG. 6, such combination being affected by an arrangement as shown in FIG. 10. In FIG. 10, an OR circuit 139 has, as inputs supplied thereto, the 22 and 10 detect outputs of modulo counter 120. OR circuit 141 has applied thereto the 0 and 12 detect outputs of modulo counter 120. The output of OR circuit 139 is applied as a set input to a flip-flop 143 and the output of OR circuit 141 is applied as a reset input to flip-flop 143. The true output of flip-flop 143 is applied to an AND circuit 145, the other input to AND circuit 145 being the vertical serration pulse output from stage 112. The output of AND circuit 145 is applied as one input to an OR circuit 147, the other input to OR circuit 147 being the output of line sync generator for terminals 122. The output of OR circuit 147 is the waveform shown in line K of FIG. 6. The examination or lines J and K show that both have vertical sync pulses, i.e., that produced by the setting and resetting of the flip-flop with count detects 22 and 0 which occur at the same time. In addition, as shown in line B of FIG. 7, the composite sync waveform for the terminals also has a vertical sync pulse provided by the setting and resetting of flip-flop 143 in FIG. 10 due to the action of counts 10 and 12 in the modulo counter. The vertical sync pulses are utilized to bring the scanning beams from the bottom right position on the screens to the starting points at the top left of the screens.

Composite Sync Generator

The output of composite sync generator 126 is applied to the beam deflection circuit 130 for the recording storage tube which controls the current in the electron beam deflection yoke 132 for the recording storage tube 134, thereby the electron beam is deflected to scan the storage screen area of the recording storage tube in the raster format shown in FIG. 8A. While the storage screen in the recording storage tube is being read, the video signal of the read therefrom is amplified by the video amplifier 136, the output of video amplifier 136 being fed to the sync and video mixers 138, 140, 142, and 144. The video signals resulting from the reading of the respective image areas are gated to the proper terminals by the action of the video gate signals from the video gate generator 124.

Video gate generator 124 has applied thereto the output of the line sync generator 122, i.e., the waveform shown in line E of FIG. 6, and an internal signal of the composite sync generator for all terminals 128, i.e., the waveform shown in line 1 of FIG. 6, there being produced from video gate generator 124 the waveforms shown on L, M, N, and O, respectively, in FIG. 6. The video gate generator may suitably be a flip-flop logic arrangement to produce the various waveforms on lines L–O in FIG. 6.

Reference is now made to the timing diagram of the waveforms shown in FIG. 7 for an explanation of the gating operation. In this connection, each sync and video mixer 138, 140, 142, and 144 has applied thereto in addition to the gating signal and the video signals, the output of composite sync generator for the terminals 128. This waveform is shown in line B of FIG. 7. Lines C, D, E, and F of FIG. 7 show the gating waveforms produced from video gate generator 124. The combining of the outputs of the composite sync generator 128, the respective gating waveforms of gate generator 124, and the video signals result in waveforms of lines H, I, J, and K in FIG. 7, the output of video amplifier 136 having the forms shown in line G of FIG. 7.

As seen in line G, the higher amplitude is the signal that represents black and the lower level represents white, the signal being in bursts, each burst corresponding to the intensity being read. It is noted that the video signal is demultiplexed and placed in the proper position to be displayed on the proper terminal corresponding to the manner in which the lines are read out and gated by the video gate generator signals in the sync video mixers. It is seen that the composite video signals for the different terminals, 0, 1, 2 and 3, all have two equally spaced vertical retrace pulses in the same time period that one vertical retrace pulse occurs in the composite sync for the recording storage tube. This is because a terminal has two fields for each frame read from the recording storage tube. In this connection, FIG. 8B, 8C, 8D and 8E illustrate how the image areas on the storage screen (FIG. 8A), are transferred line by line to terminals 0, 1, 2 and 3. Each terminal frame consists of two fields, i.e., it takes two raster scans of the display area on the terminals to generate one frame of information for all of the terminals in the system. This results from the fact that the system requires two raster scans of each terminal to be equivalent in time to one raster scan of the storage screen in the recording storage tube.

Since the information streams from the recording storage tube in a serial manner, while the screen is being read by a raster scan, the diagrams in FIG. 8A, 8B, 8C, 8D, and 8E illustrate how the half lines on the storage screen surface are distributed to the proper terminals. Thus, information read from the screen of the recording storage tube is first sent the terminal to 0, then to terminal 1, and alternates between terminal 0 and terminal 1 until one-half of the storage screen area, i.e., the upper half is completely read. Thereafter, a vertical retrace pulse is generated during terminal lines 20, 21, 22 and 23 as shown on the storage screen area and all terminals have a vertical retrace. At the end of this vertical retrace, terminals 2 and 3 start receiving video information from the storage screen. As shown in this connection, line 24 goes to terminal 2, line 25 goes to terminal 3 and the information is sent to terminals 2 and 3 during the second terminal frame field of the storage screen frame.

The last two lines which do not correspond to locations on the storage screen area, viz., lines 44, 45, 46, and 47, are used for vertical retrace for the terminals and for the storage screen. In this connection, since the composite sync pulse sequence for a raster scan device requires that the line oscillator be synchronized continuously, even during the vertical synchronization pulse, the line oscillator is so synchronized by the rise of the horizontal sync pulse or by the rise of the vertical serration pulse. Consequently, the vertical serration pulses precede the horizontal line sync pulses.

Figure 11:
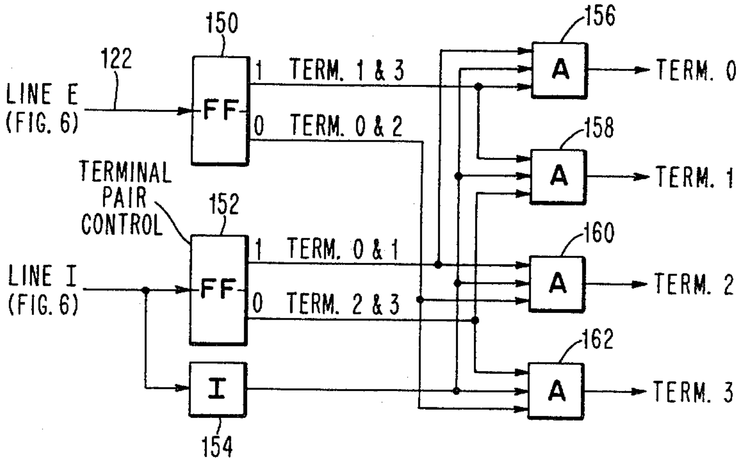
FIG. 11 is a block diagram of a circuit suitable for use as a video gate generator.

In FIG. 11, there is shown a circuit for use as the video gate generator. In this circuit, there are utilized two flip-flops 150 and 152 which are of the T flip-flop type. T flip-flops are described in the publication entitled "Logical Design of Digital Computers," Montgomery Phister, Jr., published by John Wiley & Sons, 1961, pages 126–128.

Figure 13:
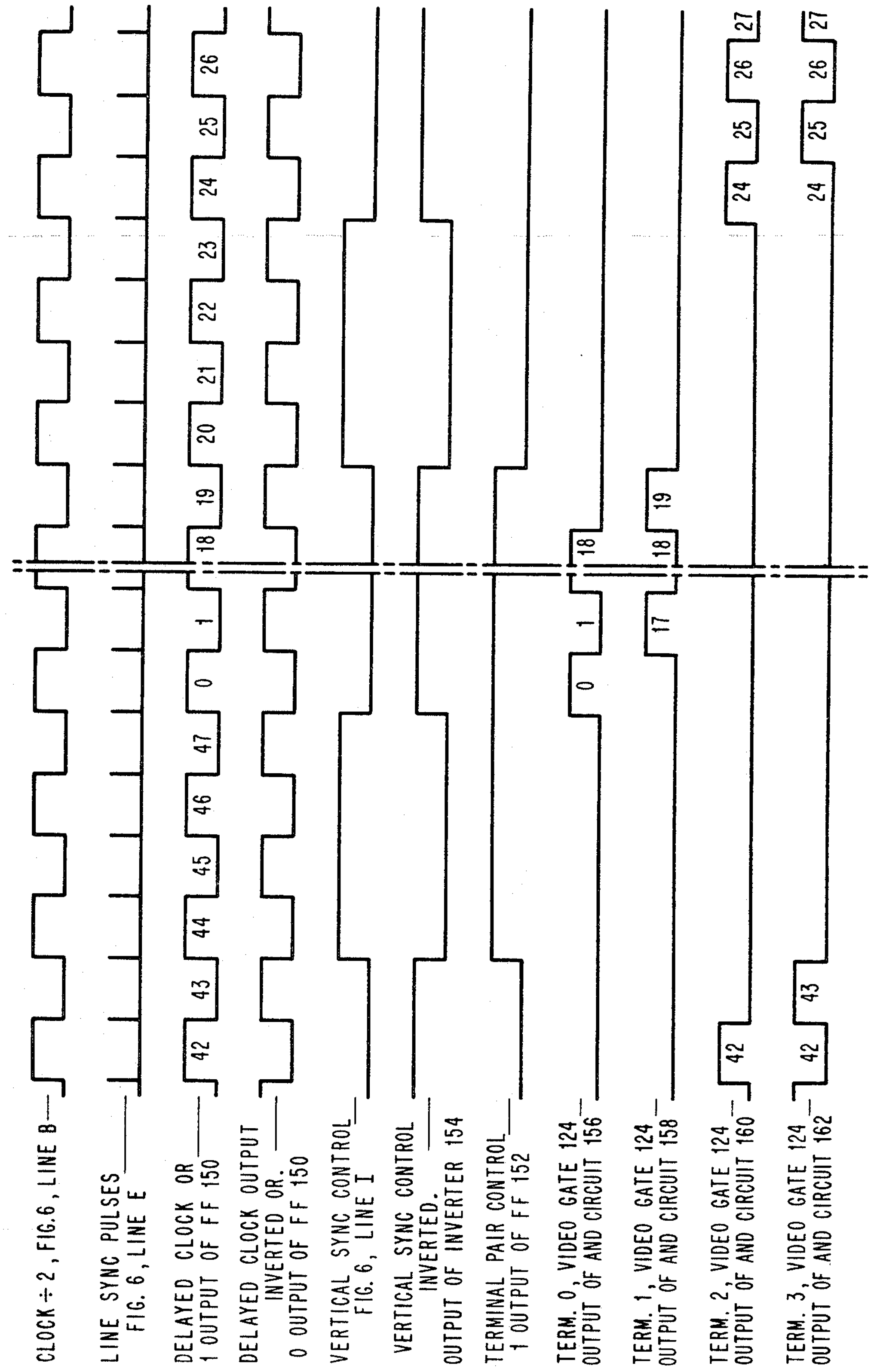
FIG. 13 is a timing diagram of waveforms which obtain in the operation of the circuit of FIG. 11.

Applied as a trigger input to flip-flop 150 is the terminal line sync signal 122 (line E, FIG. 6) and applied as a trigger input to flip-flop 152 is the vertical sync control signal (line I, FIG. 6). The vertical sync control signal is also applied to an inverter 154. The set, i.e., true output of flip-flop 150 is applied as an input to AND circuits 156 and 158. The reset, i.e., false output of flip-flop 150 is applied as input to AND circuits 160 and 162. The set, i.e., true output of flip-flop 152 is applied as an input to AND circuits 156 and 160. The reset, i.e., false output of flip-flop 152 is applied as an input to AND circuits 158 and 162. The output of inverter 154 is applied as an input to all of AND circuits 156, 158, 160 and 162. FIG. 13 shows the relationship of the waveforms which obtain in the circuit of FIG. 11.

To force the video gate generator 124, i.e., the circuit of FIG. 11 to be in the proper phase, there may be applied thereto as an input, the output of stage 114, i.e., the clock 2 pulse.

Figure 12:
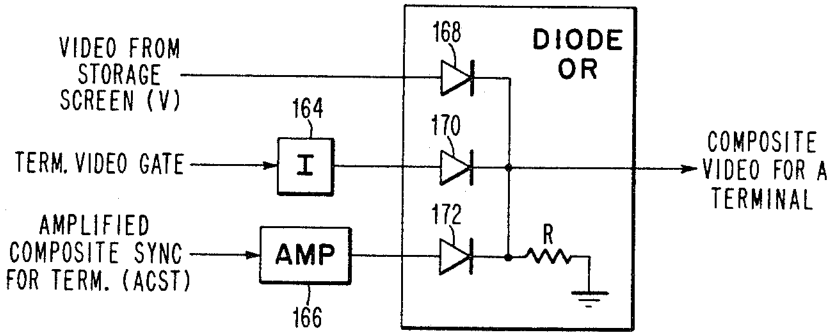
FIG. 12 is a block diagram of a circuit suitable for use as a sync and video mixer.

In FIG. 12 there is shown a circuit suitable for use as a sync and video mixer circuit. In this circuit, the terminal video gate is inverted in an inverter 164 and the composite sync for terminal is amplified in an amplifier 166. The video signal from the storage screen, the output of the inverter 164 and the output of amplifier 166 are respectively applied to the diodes 168, 170, and 172 of a three-input diode OR circuit.

Figure 14:
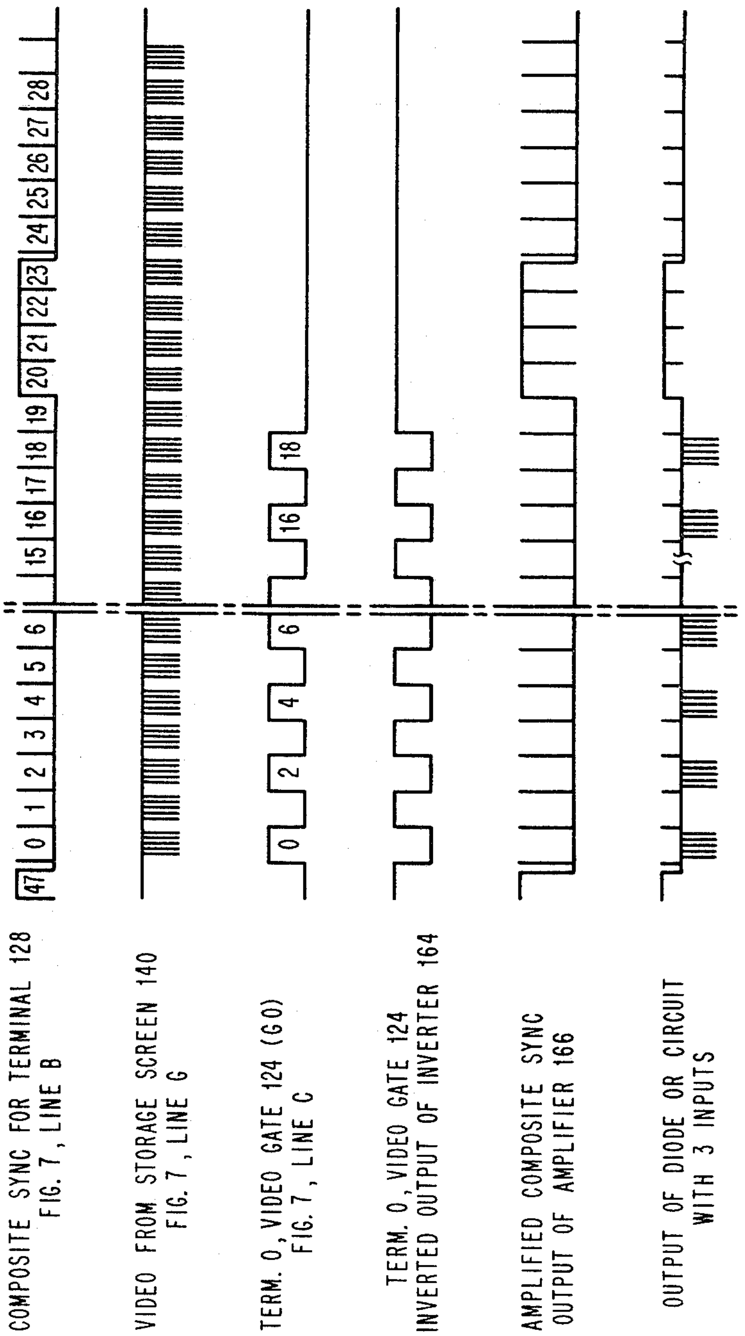
FIG. 14 is a timing diagram of the waveforms which obtain in the circuit in FIG. 12.

In FIG. 14, there is shown a timing diagram of the waveforms which obtain in the circuit of FIG. 12. It is to be noted that the output of the diode OR circuit is at the level of the highest input.

While the invention has been particularly shown and described with reference to the preferred embodiments thereof, it will be understood by those skilled in the art that various changes in form and detail may be made therein without departing from the spirit and scope of the invention.

What is claimed is:

1. A system for effecting the sharing of a recording storage tube means among a plurality of raster-scanned terminals wherein such recording storage tube means includes a raster scannable storage screen, electron beam deflection means for writing video information on said storage screen, and electron beam deflection means for reading the written video information from said storage screen comprising:

means adapted to be connected to said recording storage tube means for providing a chosen plurality of video images to be written respectively on said chosen plurality of discrete image areas on said screen;

means for generating a first signal which is a composite of horizontal and vertical sync signals for said recording storage tube reading electron beam deflection means;

means for generating a second signal in synchronism with said first signal which is a composite of horizontal and vertical sync signals for said terminals;

means for applying said first signal to said recording storage tube to cause video images stored on said storage screen to be read therefrom;

means for generating a chosen plurality of gate signals in synchronism with said first and second signals, each of said gate signals being associated with a discrete one of said terminals;

sync and video mixer means;

means for applying to said sync and video mixer means, said read video images, said second signal and said gate signals to combine said gate signals with said video images and said second signal;

and means for applying the output of said sync and video mixer means to said terminals whereby said gate signals effect the providing to each of said terminals the one of said images respectively destined therefor.

2. A system for effecting the sharing of a recording storage tube means among a plurality of raster-scanned terminals wherein said recording storage tube means includes a raster scannable storage screen, electron beam deflection means for writing video information on said storage screen, and electron beam deflection means for reading written video information from said storage screen comprising:

means adapted to be connected to said recording storage tube means for providing a chosen plurality of video images to be written respectively, on said chosen plurality of discrete image areas on said storage screen;

means for generating a first signal which is a composite of horizontal and vertical sync signals for said recording storage tube reading electron beam deflection means;

means for generating a second signal in synchronism with said first signal which is a composite of horizontal and vertical sync signals for said terminals;

means for applying said first signal to said recording storage tube to cause the video images on said storage screen to be read therefrom;

means for generating a chosen plurality of gate signals in synchronism with said first and second signals, each of said gate signals being associated with a discrete one of said terminals;

a plurality of sync and video mixers, each of said sync and video mixers being associated with a particular one of said terminals;

means for applying to each of said sync and video mixers, said read video signal, said second signal, and the one of said gate signals associated in common with a particular sync and video mixer with the same terminal;

and means for applying the outputs of each of said sync and video mixers to the terminals respectively associated therewith, whereby the video images written on the image areas of said storage screen are respectively provided to each of said terminals.

3. A system for effecting the sharing of a recording storage tube means among a plurality of raster-scanned terminals wherein said recording storage tube includes a raster scannable storage screen, means for writing video information on said storage screen and electron beam deflection means for reading the written video information from said storage screen comprising:

means adapted to be connected to said recording storage tube for providing a chosen plurality of video images to be written respectively on said chosen plurality of discrete image areas on said screen:

means for generating a pulse train having a frequency equal to the desired terminal line repitition rate in said system;

means responsive to said pulse train generating means for generating in synchronism with said pulse train a line sync signal for said recording storage tube for reading electron beam deflection means;

means for generating in synchronism with said pulse train, a line sync signal for said recording storage tube;

means for generating in synchronism with said pulse train, line sync signals for said terminals;

means for generating in synchronism with said pulse train, vertical sync pulses;

means for combining said vertical sync signals and said line sync signal for said recording storage tube to produce a first signal in synchronism with said pulse train which is a composite of the horizontal and vertical sync signals for said recording storage tube;

means for combining said line sync signal for said terminals with said vertical sync signal to produce a second signal which is a composite of the horizontal and vertical sync signals for said terminals;

means for applying said first signal to said recording storage tube to cause the video images on said storage screen to be read therefrom;

means responsive to the application thereto of said line sync signals for said terminals and said vertical sync pulses for generating said plurality of gate signals in synchronism with said first and second signals;

each of said gate signals being associated with a discrete one of said terminals; a plurality of sync and video mixers, each of said sync and video mixers being associated with a particular one of said terminals;

means for applying to each of said sync and video mixers, said read video signal, said second signal and the one of said gate signals associated in common with the particular sync and video mixer with the same terminal;

and means for applying the outputs of each of said sync and video mixers to the terminals respectively associated therewith whereby the video images stored on the image areas of said storage screen are respectively provided to each of said terminals.

4. A system as defined in claim 3 and further including means for generating vertical serration pulses for said recording storage tube which are combined in said first signal with said horizontal and vertical sync signals;

and means for generating vertical serration pulses for said terminals which are combined in said second signal with said horizontal and vertical sync signals for said terminals.

5. A system as defined in claim 4 wherein the means for generating said vertical sync pulses comprises a counter which cycles at a chosen number of pulses, first chosen ones of said pulses generating vertical sync pulses for said recording storage tube, other chosen ones of the said pulses generating vertical sync pulses for said terminals.

6. A system for effecting the sharing of a recording storage tube means among a plurality of raster-scanned terminals wherein said recording storage tube means includes a raster scannable storage screen, means for writing video information on said storage screen, and electron beam deflection means for reading the written video information from said storage screen comprising:

means adapted to be connected to said recording storage tube means for providing a plurality of video images to be written respectively on said plurality of discrete image areas on said screen;

first pulse generating means for generating a pulse train having a frequency equal to the line repetition rate of said terminals;

second pulse generating means responsive to the output of said first pulse generating means for generating a pulse train having a frequency equal to one-half the frequency of said first pulse train;

means responsive to the output of the said first pulse generating means for generating in synchronism with said first train, vertical serration pulses for said terminals;

means responsive to the output of said second pulse generating means for generating in synchronism with said second pulse train, vertical serration pulses for said recording storage tube deflection means;

means responsive to the output of said recording storage tube vertical serration pulse generating means for producing in synchronism with said second pulse train, line sync signals for said recording storage tube;

a counter which cycles at a chosen number responsive to the output of said line sync pulse generating means for said recording storage tube for producing said chosen number of pulses in each of its cycles in synchronism with said second pulse train;

means responsive to the output of said vertical serration pulse generating means for said terminals for generating in synchronism with said first pulse train line sync signals for said terminals;

means responsive to the application thereto of the outputs of said vertical serration pulse generating means for said recording storage tube and line sync signal generating means for said recording storage tube and chosen pulses of said counter for producing a first signal which is a composite of said vertical serration pulses for said recording storage tube, the line sync pulses for the recording storage tube and said counter pulses, said last named pulses generating vertical sync pulses for said recording storage tube;

means for applying said first signal to said recording storage tube to cause the video images on said storage screen to be read therefrom;

means responsive to the application thereto of the output of said vertical serration pulse generating means for said terminals, said line sync signals generating means for said terminals, said chosen pulses from said counter and said other chosen pulses from said counter, said pulses from said counter generating vertical sync pulses for said terminals, for generating a second signal which is a composite of the vertical serration pulses for said terminals, the line sync signals for said terminals and the vertical sync pulses for said terminals;

gate generating means for generating a plurality of gate signals in synchronism with said first pulse train, each of said gate signals being associated with a discrete one of said terminals;

a plurality of sync and video mixers, each of said sync and video mixers being associated with a particular one of said terminals;

means for applying to each of said sync and video mixers, said read video signals, said second signal, and the one of said gate signals associated in common with the particular sync and video mixer with the same terminal;

and means for applying the outputs for each of said sync and video mixers to the terminals respectively associated therewith, whereby the video images written on the image areas of said storage screen are respectively provided to each of said terminals.

* * * * *